No. 828,841. PATENTED AUG. 14, 1906.
J. COTTRELL.
LOCKING BAND FOR PNEUMATIC TIRE COVERS.
APPLICATION FILED DEC. 30. 1902.
2 SHEETS—SHEET 1.
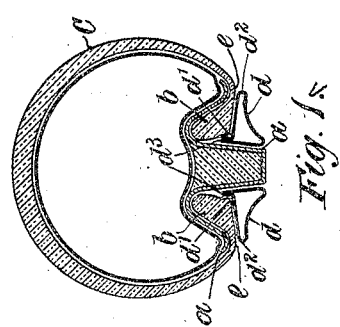
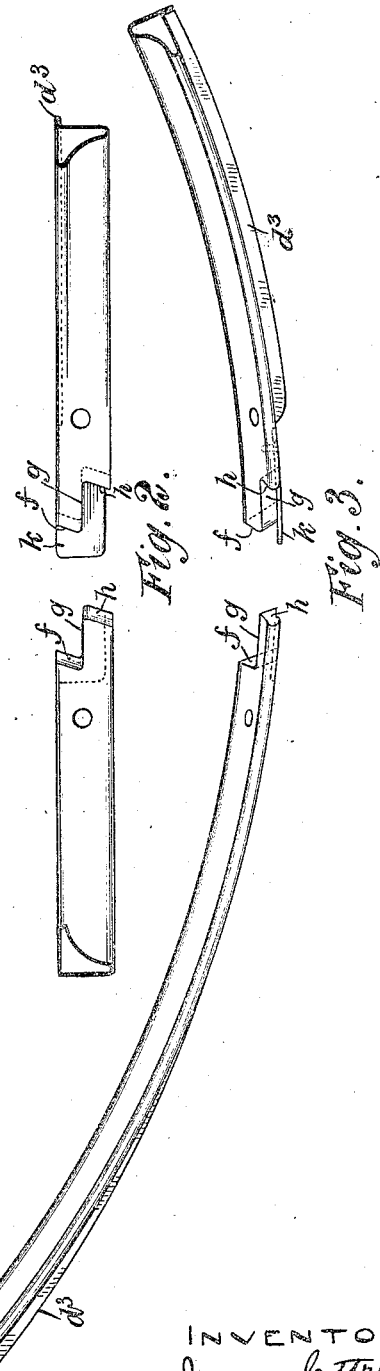
WITNESSES
H. M. Kuehne
J. M. Dowling
INVENTOR
James Cottrell
BY Richardson
ATTORNEYS

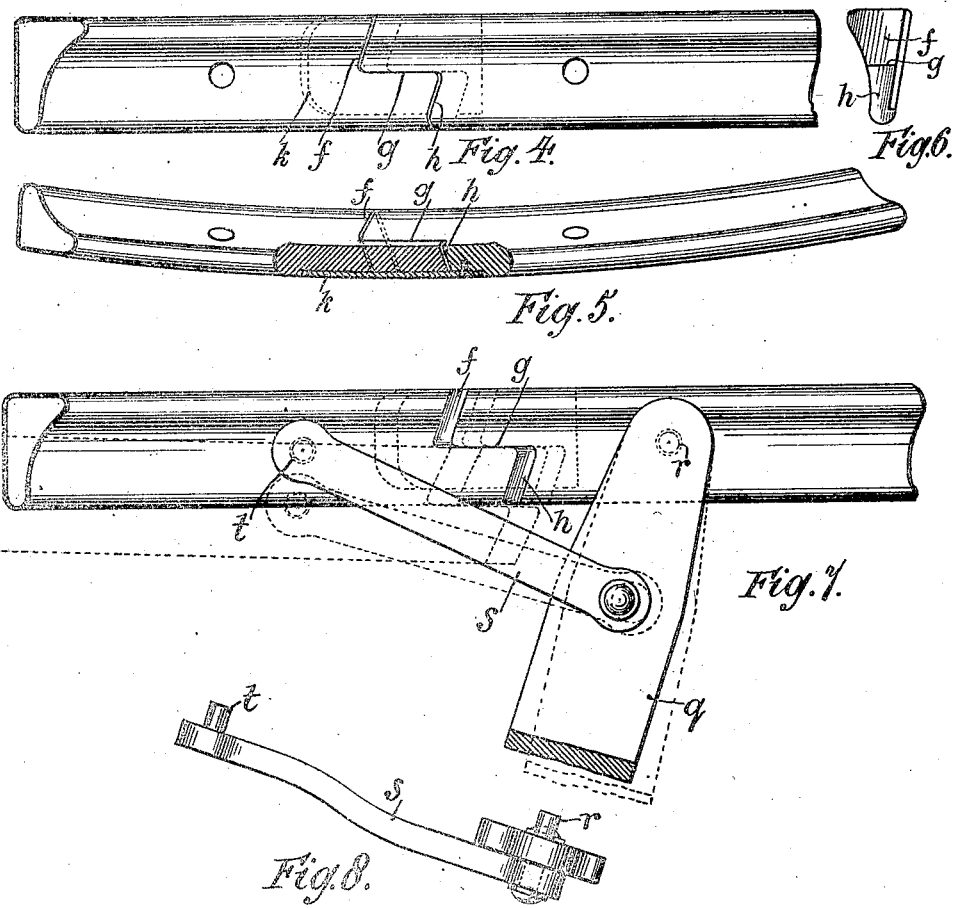

UNITED STATES PATENT OFFICE.

JAMES COTTRELL, OF LONDON, ENGLAND, ASSIGNOR TO ALFRED HENRY SMITH, OF LONDON, ENGLAND.

LOCKING-BAND FOR PNEUMATIC-TIRE COVERS.

No. 828,841. Specification of Letters Patent. Patented Aug. 14, 1906.

Application filed December 30, 1902. Serial No. 137,161.

*To all whom it may concern:*

Be it known that I, JAMES COTTRELL, of 39 Glyn street, Upper Kennington Lane, in the county of Surrey, London, England, (whose post-office address is the same as above,) have invented certain new and useful Improvements in Locking-Bands for the Covers of Pneumatic Tires; and I do hereby declare the following to be a full, clear, and exact description of the invention, such as will enable others skilled in the art to which it appertains to make and use the same.

This invention relates to an improved construction of locking-bands for securing the covers of pneumatic tires for wheels such as are described in Patent No. 647,077. The special feature of those bands which are continuous rings consists in their conical form, the diameter at the inner edge exceeding that at the outer edge. This has the effect of causing the thickened edge of the tire-cover on inflation to force the band toward the middle plane of the wheel, and thereby secure the attachment of the cover.

According to the present invention the bands are not continuous rings, but are furnished with one or more joints and are adapted to permit the circumference of the band on completing its insertion into the wheel to be expanded to a sufficient extent to grip and be gripped by the edge of the cover securely, independently of the inflation of the tire. The new construction facilitates the manipulation of a heavy tire, such as is required for a motor, and permits of an adjustment of its circumference so that it may adapt itself to tire-covers of different thicknesses.

There are various ways in which the ends of the discontinuous band may be butted and jointed. In all of them the security of the connection is derived from the interlocking action of the joint under the action of a tangential thrust along the band due to the elasticity of the wheel and tire-cover after the band has been forced into place.

To effect the fastening, the ends are thrust apart a very small distance farther than the normal position they will occupy, and in the subsequent approach they seat themselves one into the other in such a way at to permit of no lateral displacement of the ends relatively to one another outward from the wheel parallel to the axis or inward in the direction of the radius.

In order to clearly explain how my invention is carried into practical effect, reference will now be made to the accompanying drawings, in which—

Figure 1 shows a section of the rim of a wheel fitted with a pneumatic tire secured in position by one form of the locking-bands. Figs. 2 and 3 are other views, on a larger scale, of a portion of the locking-band alone, the band in this case being provided with a retaining-flange. One of the most simple forms of interlocking butt-joint is also shown in these figures. Figs. 4, 5, and 6 are three views of the joint of a band which has not got a flange. Figs. 7 and 8 show the construction of and method of using the tool employed in inserting and removing the band. Fig. 9 shows a modification of the interlocking butt-joint, also a device for providing the requisite flexibility to bands of large section used in motor-wheels, and, further, a device for adjusting the length of the circumference to adapt the bands to covers of various thicknesses; and Fig. 10 shows an alternative form of joint.

For the purpose of explaining the nature of the invention it will be desirable to make a short reference to the previous patent, No. 647,077, in which it was described how a pneumatic-tire cover could be secured to the rim of a wheel which has a section shaped like $a$ in Fig. 1. The thickened edges $b\ b$ of the tire-cover C were inserted into recesses formed within the rim of the wheel and held in place by the introduction on each side of the wheel of a circular band $d$, this band having such a section that the diameter at the part $d'$ toward the central plane of the wheel was greater than at $d^2$, the surface $d'\ d^2$ being slightly coned. When the tire was inflated, the effect of this construction was to cause the thickened edge to press on the band in such a way as to provide a component force tending to urge the band toward the central plane of the wheel, and thus securely lock the band in place; but in order that the continuous band may be inserted it is necessary in this construction that the diameter of the portion $d'$ should not exceed the diameter at the point $e$, and therefore for the locking-band to be effective it is requisite for it to be somewhat accurately fitted. This sometimes involves a difficulty in its insertion and removal.

According to the present invention the band is made discontinuous, and observing that it has a certain amount of elasticity the band, which is temporarily made smaller in diameter by causing the ends at the joint to overlap one another, can be easily inserted in place and then expanded to its full diameter. By means of this improvement not only can the edge $d'$ of the cone be made larger in diameter than at the point $e$, but an outwardly-extending flange $d^3$ can be provided on the major portion of the circumference of the band and inserted behind the thickened edges of the tire-cover, so that the band and tire may be firmly held in place, each securing the other independently of the inflation of the tire.

The butt-joint, where the several ends of the band meet, is so constructed that a tangential thrust along its length causes each end to hold the other and prevent any relative displacement either in the direction of the axis or in the direction of the radius of the wheel. One of the most simple forms of this joint is shown in Figs. 2 and 3 and also in Figs. 4, 5, and 6. In these there is a stepped butt-joint with three surfaces of mutual contact $f$, $g$, and $h$. $g$ lies in a plane parallel to the central plane of the wheel, and the surfaces $f$ and $h$, which are parallel to one another, are made oblique, both to the central plane of the wheel and also to a radial plane through the axis of the wheel. When the two ends are butted together, the first of these two obliquities, together with the surface $g$, will preclude any relative motion of the ends in a direction parallel to the axis of the wheel and the second-mentioned obliquity of the surfaces $f$ and $h$, together with the effect of a sole-plate $k$, will preclude any radial separation of the two ends. The sole-plate $k$ is fastened by rivets or brazing to one of the ends, as shown. The sole-plate may be dispensed with if the joint is made with a stepped surface, as shown in Fig. 9, in which there are surfaces of mutual contact $l$ $m$ $n$ $o$ $p$, of which the obliquity of the surfaces $l$ and $p$ relatively to a radial plane through the axis of the wheel is equal, but in the opposite direction to the obliquity of the surface $n$.

The band shown in Figs. 1, 2, and 3 is provided with a flange $d^3$, of which the portion in the proximity of the joint at one end tapers away to nothing. To insert this band tightly into a wheel, the end or the right-hand side of Fig. 3 is first inserted into place and the rest of the band caused to follow, the band being sufficiently flexible to be somewhat reduced in diameter for the purpose. When nearly in place, the ends will lie by the side of one another overlapping each other, as shown in dotted lines in Fig. 7. To complete the insertion, it will be requisite to force the ends away from one another in a tangential direction. This is readily performed by means of the tools shown in Figs. 7 and 8. It consists of a lever $q$, which has a stud $r$ at one end projecting from its surface, and a pivoted link $s$, which also has a stud $t$ projecting from its surface. To thrust the two ends, which are required to butt, away from one another and at the same time to give the end which is not completely inserted a push toward the middle plane of the wheel, the stud $r$ on the lever is inserted into a small hole provided in the end of the band which was first inserted in place and the stud $t$ on the link $s$ into a corresponding hole formed in the other end, as shown by the dotted lines in Fig. 7. The lever is forced in a direction to cause a thrust along the link. The chief component of that thrust will be in the direction of the tangent; but there will also be a component in a direction toward the middle plane of the wheel. The two ends being by this means thrust away from one another a slight distance more than sufficient to bring the oblique surfaces together, the whole length of the band will be forced into one plane, as shown in full lines in Fig. 7, and on relaxing the pressure on the lever the elasticity of the wheel and tire-cover will cause the ends of the band to butt together and become interlocked with one another. To remove the band, the studs are inserted into the holes conversely and a force is applied to the lever in a direction to again cause a thrust along the link $s$, when the effect will be to displace from the wheel the end of the band last inserted. Instead of providing holes in the band and studs on the lever and link, the band may conversely carry the studs and holes be formed in the lever and link. Inasmuch as the link is in both operations subjected to a thrust a hole in the link will not be necessary. A groove would be sufficient for the purpose. In order to insert or remove a band, it is necessary that it should be capable of being elastically distorted out of one plane. In the case of bands of considerable section and small diameter, such as may be required for the wheels of motors, the rigidity may be too great for this purpose, in which case a portion of the band is joined to the remainder, as shown at $u$ in Fig. 9. It may also be desirable to adjust the length of the circumference of the band in order to insert it or remove it, if very rigid, or to adjust for varying thicknesses in the material of the cover or slight disconformity in the diameters of the rims of the wheels. This can be readily effected by the joint $v$, Fig. 9, in which the screw $w$ is double-ended with either a right and a left handed thread or with one thread only, the other end being simply a dowel. There is yet another kind of butting-joint shown in Fig. 10. In this case the butting-surfaces consist of one plane only, oblique in both of the previously-mentioned directions, a sole-plate being provided, as previously described, and a link $x$ pivoted to each end of the band, the centers of the pivots deviating from the center of the band, as shown, in such a way that a thrust along the band when transmitted along the link $x$ makes it turn in such a direction as to cause the butting-surfaces to approach one another transversely. Instead of a nearly complete flange $d^3$ being used, as shown in Figs. 2 and 3, the greater portion may be removed, leaving projecting ears at intervals only. Instead of the band being in one piece and having only one butting-joint it may be made in separate pieces having two or more butting-joints.

What I claim is—

1. A discontinuous locking-band for securing the cover of a pneumatic tire to the rim of a wheel in which the butting ends of the band are stepped and the surfaces thereof cut obliquely both to the central plane of the wheel and to a radial plane passing through the axis of the wheel, and to one end of which a sole-plate is secured.

2. A discontinuous locking-band for securing the cover of a pneumatic tire to the rim of a wheel in which the butting ends of the band are shaped to interlock in one another, the band having an outwardly-extending flange on its inner edge of which a portion on one side of the point of division is omitted.

3. A discontinuous locking-band for securing the cover of a pneumatic tire to the rim of a wheel in which the butting ends of the band are shaped to interlock in one another and near the ends of which transverse surfaces are provided adapted to receive the pressure of a tool to spring the ends of the band apart.

4. A discontinuous locking band for securing the cover of a pneumatic tire to the rim of a wheel in which the butting ends of the band are shaped to interlock in one another and near the ends of which holes are provided to receive studs formed on a tool to spring the ends of the band apart.

5. A discontinuous locking-band for securing the cover of a pneumatic tire to the rim of a wheel in which the butting ends of the band are shaped to interlock in one another and in which one portion of the band is pivoted to the other and in which a further joint is provided which is adapted to adjust the length of the circumference of the band.

6. A combination consisting of a wheel-rim provided with recesses formed within its internal periphery, a tire-cover having fortified edges adapted to fit into the before-mentioned recesses in the wheel-rim and a discontinuous locking-band the butting ends of which are so formed as to preclude lateral displacement relatively to one another without tangential separation of the ends substantially as described.

In testimony whereof I have hereunto set my hand in the presence of two subscribing witnesses.

JAMES COTTRELL.

Witnesses:
T. A. HEARSON,
WALTER J. SKERTEN.